(12) United States Patent
Zou et al.

(10) Patent No.: US 11,132,572 B2
(45) Date of Patent: Sep. 28, 2021

(54) METHOD AND SYSTEM FOR SPLICING AND RESTORING SHREDDED PAPER BASED ON EXTREME LEARNING MACHINE

(71) Applicant: XIANGTAN UNIVERSITY, Xiangtan (CN)

(72) Inventors: Juan Zou, Xiangtan (CN); Zhenghui Zhang, Xiangtan (CN); Bing Wu, Xiangtan (CN); Lingtao Zeng, Xiangtan (CN); Qiuzhen Wang, Xiangtan (CN); Jinhua Zheng, Xiangtan (CN)

(73) Assignee: Xiangtan University, Xiangtan (CN)

( * ) Notice: Subject to any disclaimer, the term of this patent is extended or adjusted under 35 U.S.C. 154(b) by 0 days.

(21) Appl. No.: 16/562,574

(22) Filed: Sep. 6, 2019

(65) Prior Publication Data
US 2020/0097748 A1 Mar. 26, 2020

(30) Foreign Application Priority Data

Sep. 20, 2018 (CN) .......................... 201811102654.X

(51) Int. Cl.
*G06K 9/20* (2006.01)
*G06K 9/00* (2006.01)
(Continued)

(52) U.S. Cl.
CPC ....... *G06K 9/2063* (2013.01); *G06K 9/00228* (2013.01); *G06K 9/00442* (2013.01);
(Continued)

(58) Field of Classification Search
CPC ............ G06K 9/2063; G06K 9/00228; G06K 9/00483; G06K 9/6271; G06K 9/4619;
(Continued)

(56) References Cited

FOREIGN PATENT DOCUMENTS

CN 103295019 A * 9/2013 ............... G06K 9/60

OTHER PUBLICATIONS

Jiang, "Research on the Paper Splicing Recovery" (published in Applied Mechanics and Materials, vols. 602-605, pp. 3443-3446, Aug. 2014). (Year: 2014).*

(Continued)

*Primary Examiner* — Casey L Kretzer
(74) *Attorney, Agent, or Firm* — Troutman Pepper Hamilton Sanders LLP; Christopher C. Close, Jr.

(57) ABSTRACT

Disclosed is a method and system for splicing and restoring shredded paper based on an extreme learning machine ("ELM"). The method includes: acquiring a shredded paper training sample to be spliced; extracting left and right boundary feature data of the sample; training an ELM neural network model according to the feature data to obtain a trained neural network model ("TNNM"); acquiring a shredded paper test sample to be spliced; extracting feature data of the test sample; selecting a first piece of to-be-spliced shredded paper; selecting, by the TNNM, a shredded piece with a highest degree of coincidence with the first piece; determining whether the shredded piece is correctly spliced to the first piece; if yes, splicing shredded paper until all shredded paper is spliced and restored; if not, adopting manual marking, and continuing to select, by the TNNM, shredded paper with a highest degree of coincidence with the first piece.

6 Claims, 5 Drawing Sheets

(51) Int. Cl.
  *G06N 3/08* (2006.01)
  *G06T 5/00* (2006.01)
(52) U.S. Cl.
  CPC ............ *G06K 9/00483* (2013.01); *G06N 3/08* (2013.01); *G06T 5/001* (2013.01)
(58) Field of Classification Search
  CPC ........ G06K 9/00442; G06K 9/66; G06N 3/08; G06N 3/04; G06T 5/001
  See application file for complete search history.

(56) References Cited

OTHER PUBLICATIONS

Luo et al, "Research on the Recovery of Shredding Based on Matching Algorithm" (published in 2017 International Conference on Computer Technology, Electronics and Communication, pp. 540-544, Dec. 2017) (Year: 2017).*

* cited by examiner

METHOD AND SYSTEM FOR SPLICING AND RESTORING SHREDDED PAPER BASED ON EXTREME LEARNING MACHINE

This application claims priority to Chinese application number 201811102654.X, filed Sep. 20, 2018, with a title of METHOD AND SYSTEM FOR SPLICING AND RESTORING SHREDDED PAPER BASED ON EXTREME LEARNING MACHINE. The above-mentioned patent application is incorporated herein by reference in its entirety.

TECHNICAL FIELD

The present invention relates to the field of machine learning in artificial intelligence, and in particular to a method and system for splicing and restoring shredded paper based on an extreme learning machine.

BACKGROUND

With the popularity and rapid development of computers, a lot of complicated and tiring work has been replaced by computers. Especially thanks to the rise of artificial intelligence based on neural networks in recent years, computers have affected all aspects of our lives. The rapid development of artificial intelligence benefits from big data generated by the Internet and the improvement of computer performance Currently, a convolutional neural network (CNN) and a recurrent neural network commonly used in the industry require a large amount of data to perform a lot of training on a model to make the model generalization capability stronger, but there are many examples in the real life that there are very few samples, and it is impossible to use a regular neural network for a lot of training. Therefore, finding a small sample with a certain generalization performance has important research significance.

A splicing and restoration model of shredded paper has important applications in the fields of document security protection, judicial material evidence restoration, historical document restoration and military intelligence acquisition. There are two cases in the recovery of shredded paper. One is shredded paper with an irregular edge under a tearing mode. In this case, the splicing and restoration are performed by the contour matching of the irregular edge, and the reduction rate is higher while the recovery difficulty is lower, which will not be discussed herein. The other is shredded paper with a regular edge cut by a paper shredder. Since the edge shape is the same, matching cannot be performed through the contour, and only edge features can be extracted for matching. Only by matching through the figure edge feature extraction can shredded paper with a high matching degree be found for splicing. Conventionally, the efficiency of splicing and restoring shredded paper by labor is very low. Therefore, it is very important and meaningful work to study how to use a computer technology to accurately and quickly complete the splicing and restoring shredded paper. The research and practice of this scene provides a feasible and innovative idea for small sample machine learning and image feature extraction, and provides a reference for the implementation of similar scene algorithms All parameters in the conventional neural network need to be adjusted to achieve an optimal target output solution, but this adjustment needs to be continuously iterated by a gradient descent error back propagation algorithm. Obviously, the learning speed of this method is very slow.

SUMMARY

An objective of the present invention is to provide a method and system for splicing and restoring shredded paper based on an extreme learning machine, which can well splice and restore shredded paper quickly.

To achieve the above purpose, the present invention provides the following technical solution.

A method for splicing and restoring shredded paper based on an extreme learning machine includes:

acquiring a shredded paper training sample to be spliced;

extracting left and right boundary feature data of the shredded paper training sample;

training an extreme learning machine neural network model according to the left and right boundary feature data, to obtain a trained neural network model;

acquiring a shredded paper test sample to be spliced;

extracting left and right boundary feature data of the shredded paper test sample;

selecting a piece of shredded paper as a first piece of to-be-spliced shredded paper according to a principle of splicing a first piece of paper;

selecting shredded paper with a highest degree of coincidence with the first piece of to-be-spliced shredded paper by the trained neural network model;

determining whether the shredded paper with the highest degree of coincidence is correctly spliced to the first piece of to-be-spliced shredded paper;

if yes, splicing shredded paper until all the shredded paper is spliced and restored; and if not, adopting manual marking, and continuing to select shredded paper with a highest degree of coincidence with the first piece of to-be-spliced shredded paper by the trained neural network model.

Optionally, the extracting left and right boundary feature data of the shredded paper training sample specifically includes:

performing binarization processing on the shredded paper training sample to obtain a sequence pixel matrix; and combining the pixel matrix information with text information of the shredded paper training sample to obtain the left and right boundary feature data of the shredded paper; where the left and right boundary feature data of the shredded paper is represented by a formula $\tilde{F}_{r\ or\ 1} = \{a_1, a_2, a_3, a_4, \ldots, a_n\}$, where $a_i$ represents an edge pixel value and $a_i$ is equal to 0 or 255.

Optionally, the principle of splicing a first piece of paper is to select a piece of shredded paper with a left boundary being a white edge as a first piece of shredded paper of a spliced line.

Optionally, the training an extreme learning machine neural network model according to the left and right boundary feature data, to obtain a trained neural network model specifically includes:

using the left and right boundary feature data as an input of an extreme learning machine neural network model to obtain output data;

determining whether the output data is within an error range threshold;

if yes, determining the neural network model as a trained neural network model; and if not, adjusting parameter weights of the neural network model such that the output data is within the error range threshold to obtain a trained neural network model.

To achieve the above purpose, the present invention provides the following technical solutions.

A system for splicing and restoring shredded paper based on an extreme learning machine includes:

a training sample acquiring module, configured to acquire a shredded paper training sample to be spliced;

a training sample feature extraction module, configured to extract left and right boundary feature data of the shredded paper training sample;

a training module, configured to train an extreme learning machine neural network model according to the left and right boundary feature data, to obtain a trained neural network model;

a test sample acquiring module, configured to acquire a shredded paper test sample to be spliced;

a test sample feature extraction module, configured to extract left and right boundary feature data of the shredded paper test sample;

a module for selecting a first piece of spliced shredded paper, configured to select a piece of shredded paper as a first piece of to-be-spliced shredded paper according to a principle of splicing a first piece of paper;

a coincidence degree calculating module, configured to select shredded paper with a highest degree of coincidence with the first piece of to-be-spliced shredded paper by the trained neural network model; and a determining module, configured to determine whether the shredded paper with the highest degree of coincidence is correctly spliced to the first piece of to-be-spliced shredded paper;

if yes, splice shredded paper until all the shredded paper is spliced and restored; and if not, adopt manual marking, and continue to select shredded paper with a highest degree of coincidence with the first piece of to-be-spliced shredded paper by the trained neural network model.

Optionally, the training sample feature extraction module specifically includes:

a binarization processing unit, configured to perform binarization processing on the shredded paper training sample to obtain a sequence pixel matrix; and a left and right boundary feature data extraction unit, configured to combine the pixel matrix information with text information of the shredded paper training sample to obtain the left and right boundary feature data of the shredded paper;

where the left and right boundary feature data of the shredded paper is represented by a formula $\tilde{F}_{r \text{ or } l} = \{a_1, a_2, a_3, a_4, \ldots, a_n\}$, where $a_i$ represents an edge pixel value and $a_i$ is equal to 0 or 255.

Optionally, the principle of splicing a first piece of paper is to select a piece of shredded paper with a left boundary being a white edge as a first piece of shredded paper of a spliced line.

Optionally, the training module specifically includes:

an output data acquiring unit, configured to use the left and right boundary feature data as an input of an extreme learning machine neural network model to obtain output data; and a determining unit, configured to determine whether the output data is within an error range threshold;

if yes, determine the neural network model as a trained neural network model; and if not, adjust parameter weights of the neural network model such that the output data is within the error range threshold to obtain a trained neural network model.

According to an embodiment of the present invention, the present invention discloses the following technical effects: the present invention provides a method and system for splicing and restoring shredded paper based on an extreme learning machine; an extreme learning machine neural network model is adopted, only some parameters in the model need to be adjusted, but some parameters are fixed by randomly initializing input layer weights and offset values to convert a problem into a one-dimensional problem for solving by means of a function; and by applying the above-mentioned extreme learning machine neural network model to the splicing and restoring shredded paper, the shredded paper can be quickly spliced well.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make objectives, features, and advantages of the present invention more comprehensible, the following describes the present invention in more detail with reference to accompanying drawings and specific implementations.

Figure 1:
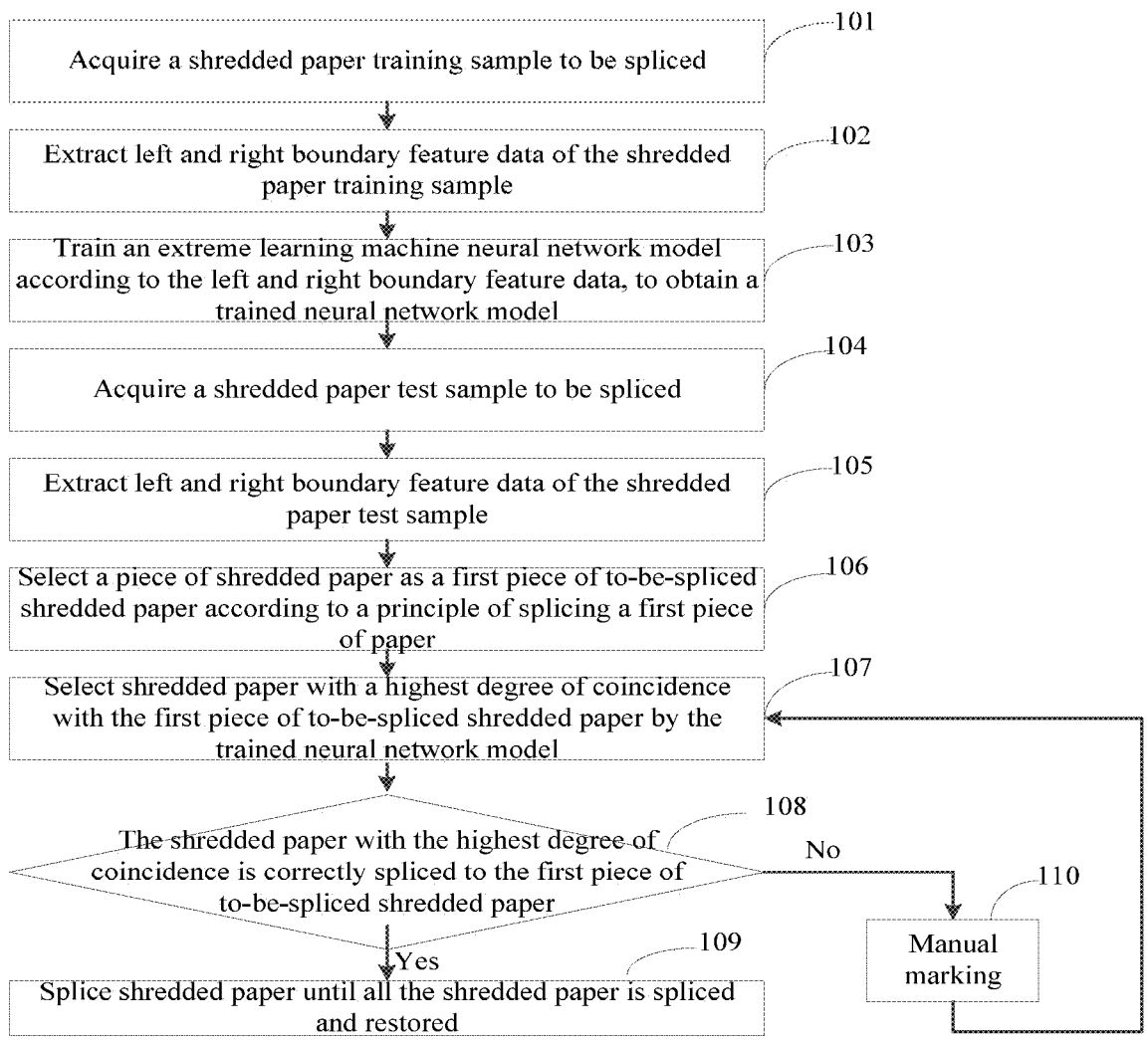
FIG. 1 is a flow chart of a method for splicing and restoring shredded paper based on an extreme learning machine according to an embodiment of the present invention.

FIG. 1 is a flow chart of a method for splicing and restoring shredded paper based on an extreme learning machine according to an embodiment of the present invention. As shown in FIG. 1, the method for splicing and restoring shredded paper based on an extreme learning machine is provided. The method includes:

Step 101: acquire a shredded paper training sample to be spliced.

Step 102: extract left and right boundary feature data of the shredded paper training sample.

Step 103: train an extreme learning machine neural network model according to the left and right boundary feature data, to obtain a trained neural network model.

Step 104: acquire a shredded paper test sample to be spliced.

Step 105: extract left and right boundary feature data of the shredded paper test sample.

Step 106: select a piece of shredded paper as a first piece of to-be-spliced shredded paper according to a principle of splicing a first piece of paper.

Step 107: select shredded paper with a highest degree of coincidence with the first piece of to-be-spliced shredded paper by the trained neural network model.

Step 108: determine whether the shredded paper with the highest degree of coincidence is correctly spliced to the first piece of to-be-spliced shredded paper.

Step 109: if yes, splice shredded paper until all the shredded paper is spliced and restored.

Step 110: if not, adopt manual marking, and continue to select shredded paper with a highest degree of coincidence with the first piece of to-be-spliced shredded paper by the trained neural network model.

The extracting left and right boundary feature data of the shredded paper training sample specifically includes:

scanning shredded paper information and numbering the shredded paper as 0, 1, 2, . . . , n−1 in sequence.

Image matrix information is read according to the numbers. Since the image information is an rbg value, an image matrix needs to be converted into a grayscale image according to a formula (1).

$$\text{Gray}=(R*299+G*587+B*114+500)/1000 \quad (1)$$

For text type shredded paper, the image is subjected to a binarization processing by setting a threshold; a threshold is set, the model processes all non-255 (white) parts to 0 (black), that is, the threshold is 255 to magnify feature effects of text on a paper boundary.

$$P_{ij} = \begin{cases} 0, & q_{ij} < 255 \\ 255, & \text{others} \end{cases} \quad (2)$$

where $q_{ij}$ is a pixel value of an image before binarization; and $P_{ij}$ is a pixel value of the image after binarization.

By the binarization processing of the formula (2) on each image, sequence pixel matrix information is obtained, and the pixel matrix information is used for feature extraction of the image, which can reflect the hierarchical structure of the shredded paper.

Structural features of the text capacity shredded paper are extracted, and by traversing the line content of the image matrix, if there is an element other than 255 (white), the content of the line is set to 0 (black). The structural features can help in matching to automatically distinguish shredded paper groups of a column where the shredded paper is located, eliminating the trouble of clustering for classification.

The pixel matrix information can be combined with text information of the shredded paper training sample to obtain a shredded paper combination feature.

Left and right boundary feature data of each piece of shredded paper is represented by a formula $\tilde{F}_{r \text{ or } l} = \{a_1, a_2, a_3, a_4, \ldots, a_i\}$, where $a_i$ represents an edge pixel value and $a_i$ is equal to 0 or 255.

For text type shredded paper, a piece of shredded paper with a left boundary being a white edge can be selected as a first piece of shredded paper of a spliced line.

The splicing process follows the left-right matching principle, that is, the left boundary feature of the currently matched shredded paper only matches the right boundary feature of the remaining shredded paper, and the right boundary feature of the currently matched shredded paper only matches the left boundary feature of the remaining shredded paper.

Step 103 specifically includes:

using the left and right boundary feature data as an input of an extreme learning machine neural network model to obtain output data;

determining whether the output data is within an error range threshold;

if yes, determining the neural network model as a trained neural network model; and if not, adjusting parameter weights of the neural network model such that the output data is within the error range threshold to obtain a trained neural network model.

In the process of determining the parameter weights of the neural network model, the parameter weights are determined by using the following method:

Given an activation function $g(x)$, and N arbitrary different samples $(x_i, t_i)$, where $(x_i, t_i)$, where $x_i=[x_{i1}, x_{i2}, \ldots, x_{in}]^T \in R^n$ and $t_i=[t_{i1}, t_{i2}, \ldots, t_{im}]^T \in R^m$, that is, given a training set $\aleph = \{(x_i, t_i)|x_i \in R^n, t_i \in R^m, i=1, \ldots, N\}$, the activation function $g(x)$ and a number of hidden neurons $\tilde{N}$.

(1) Determine the number of hidden layers to be 1, and initialize the number of hidden layer neurons to be 1.

(2) Assign any input weight $w_i$ and offset $b_i$, where $i=1, \ldots, \tilde{N}$, $w_i=[w_{i1}, w_{i2}, \ldots, w_{im}]^T$ is a weight vector connecting the i-th hidden neuron and an input neuron, and $b_i$ is a threshold of the i-th hidden neuron. $w_i \cdot x_j$ represents an inner product of $w_i$ and $x_j$.

(3) Calculate a hidden layer output matrix H. H is called a hidden layer output matrix of the neural network; and the ith column of H is an output vector of the i-th hidden neuron with respect to inputs $x_1, x_2, \ldots, x_N$.

$$H(w_1, \ldots, w_{\tilde{N}}, b_1, \ldots, b_{\tilde{N}}, x_1, \ldots, x_N) = \quad (3\text{-}3)$$
$$\begin{bmatrix} g(w_1 \cdot x_1 + b_1) & \cdots & g(w_{\tilde{N}} \cdot x_1 + b_{\tilde{N}}) \\ \vdots & \cdots & \vdots \\ g(w_1 \cdot x_N + b_1) & \cdots & g(w_{\tilde{N}} \cdot x_N + b_{\tilde{N}}) \end{bmatrix}_{N \times \tilde{N}}$$

(4) Calculate $\beta = H^\dagger T$ by Moore-Penrose generalized inverse according to $H\beta = T$ $$\beta = \begin{bmatrix} \beta_1^T \\ \vdots \\ \beta_{\tilde{N}}^T \end{bmatrix}_{\tilde{N} \times m} \quad T = \begin{bmatrix} t_1^T \\ \vdots \\ t_N^T \end{bmatrix}_{N \times m} \quad (3\text{-}4)$$

where $\beta_i=[\beta_{i1}, \beta_{i2}, \ldots \beta_{im}]^T$ is a weight vector connecting the i-th hidden neuron with an output neuron, and $H^\dagger$ is a Moore-Penrose generalized inverse matrix of H.

Through the above method, all parameters of the neural network can be obtained: $w_i$, $b_i$, and $\beta_i$;

Definition of an output layer of an extreme learning machine feature matching model:

(1) Training Sample Label

The output of the model training sample uses a same constant matrix as the input layer dimension as an output of the neural network. The constant matrix is known data and does not need to be calculated. The constant matrix is used to calculate the weight $\beta$ of the neural network output layer. In the experiment, $t_i=[t_{i1}, t_{i2}, \ldots, t_{im}]$ is used (this experiment selects $t_i=i$, the value of $t_i$ can be optional and is generally a positive integer);

(2) Detection Output Column

According to the results $w_i$, $b_i$, and $\beta_i$ calculated by training, the output is obtained by inputting the model for calculation, which is the same as the input layer dimension.

The extreme learning machine neural network model of the present invention uses a covariance as a degree of coincidence for calculation. The covariance represents a total error of two variables, which is different from a variance that only indicates an error of one variable. If two variables change in the same trend, that is, if one of the variables is greater than its own expected value and the other is also greater than its own expected value, the covariance between the two variables is a positive value. If two variables change in opposite directions, that is, if one of the variables is greater than its own expected value while the other is smaller than its own expected value, the covariance between the two variables is a negative value. A matching error is calculated according to a covariance formula $$cov(X, Y) = \frac{\sum_{i=1}^{n}(X_i - \overline{X})(Y_i - \overline{Y})}{n-1}$$

and a matching result, and the smaller the error, the higher the matching degree.

In the process of splicing, there may be a situation in which edges are similar but the splicing is wrong, which requires a small amount of manual intervention. By setting a splicing detection threshold for the model (in this model, the splicing detection threshold is set to 0.01), a splicing result with a degree of coincidence greater than or equal to 0.01 will be fed back through a CUI control interface. In case of a splicing error, the covariance is changed by manual marking, and the calculation result is subjected to secondary screening, and an experimental result shows that a correct matching result can be acquired generally by marking no more than three times in the worst case.

Figure 2:
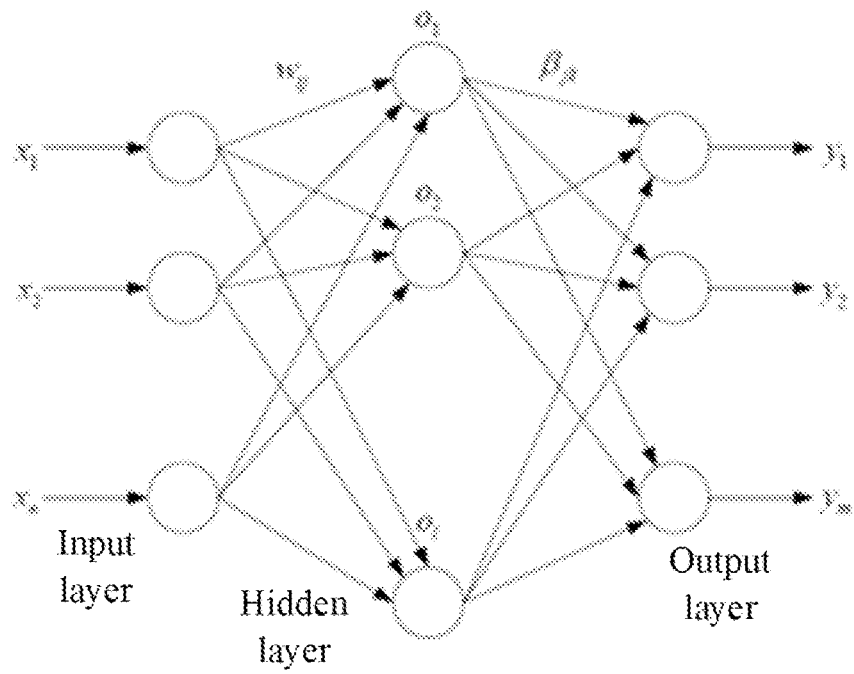
FIG. 2 is a diagram of a designed extreme learning machine neural network model according to an embodiment of the present invention.
Figure 3:
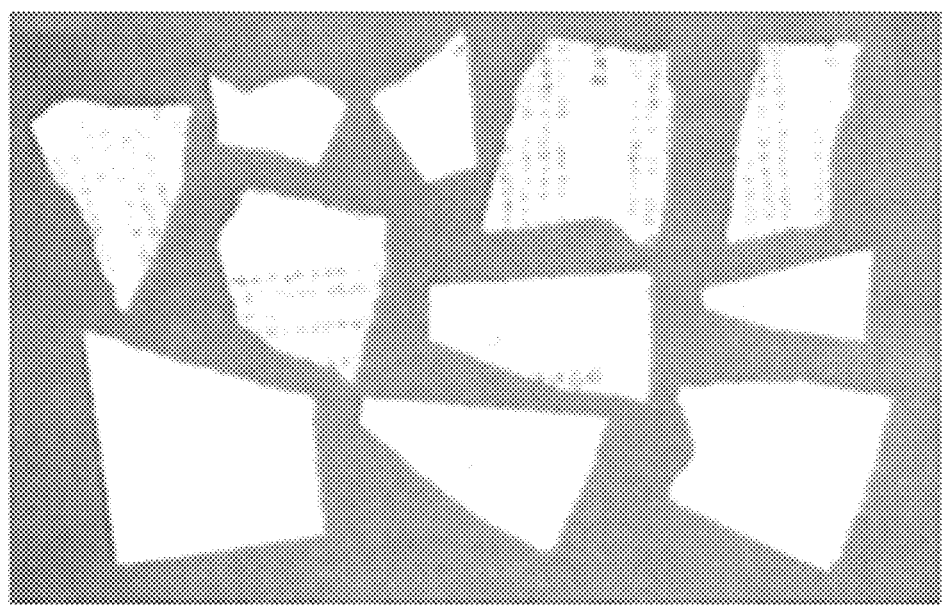
FIG. 3 is a schematic diagram of shredded paper with an irregular edge according to an embodiment of the present invention.
Figure 4:
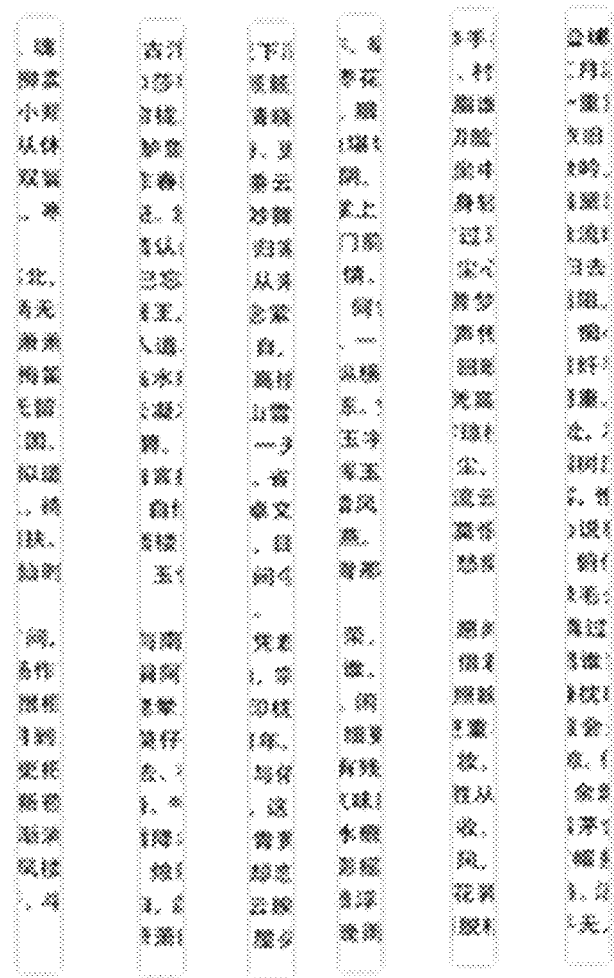
FIG. 4 is a schematic diagram of shredded paper with a regular edge according to an embodiment of the present invention.
Figure 5:
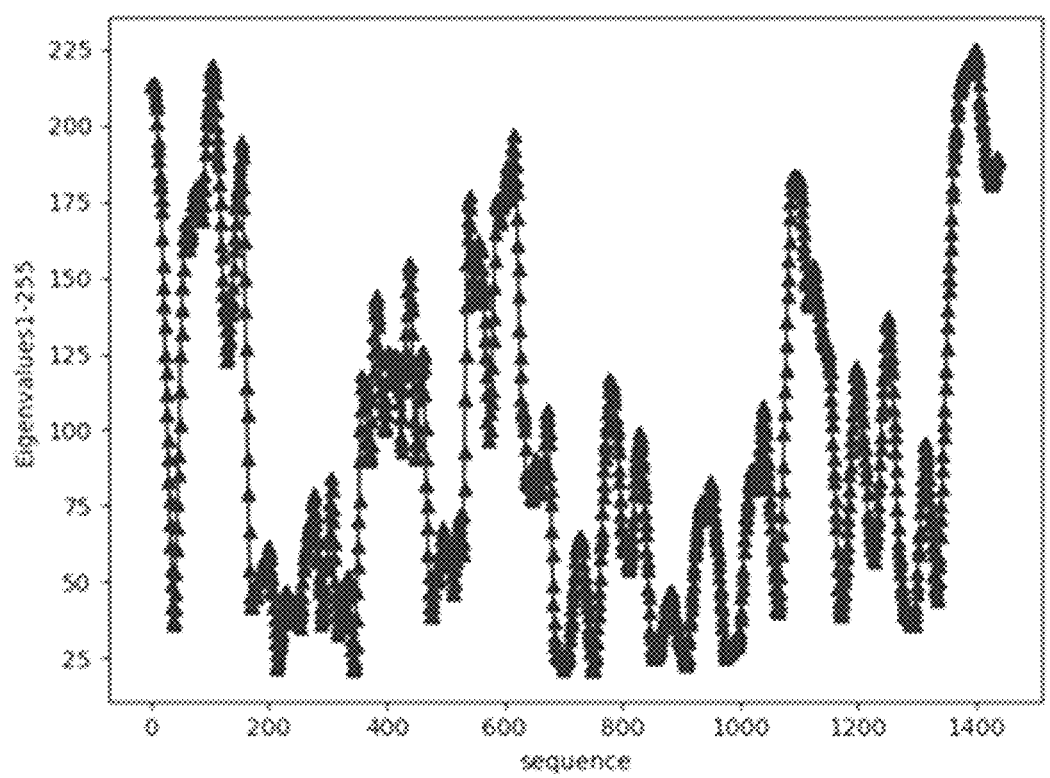
FIG. 5 is an edge feature display diagram according to an embodiment of the present invention.
Figure 6:
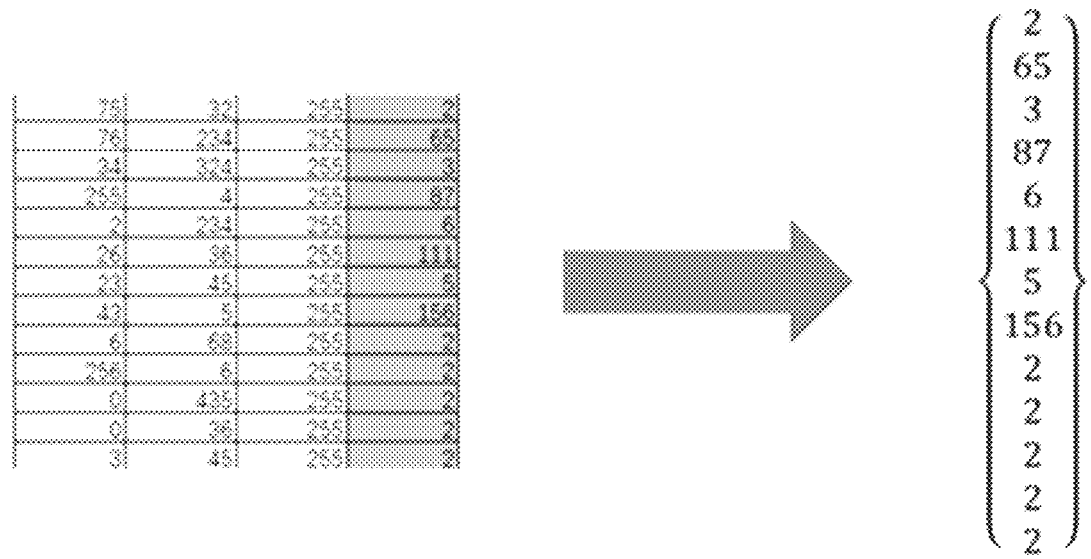
FIG. 6 is a visual diagram of shredded paper feature distribution according to an embodiment of the present invention.
Figure 7:
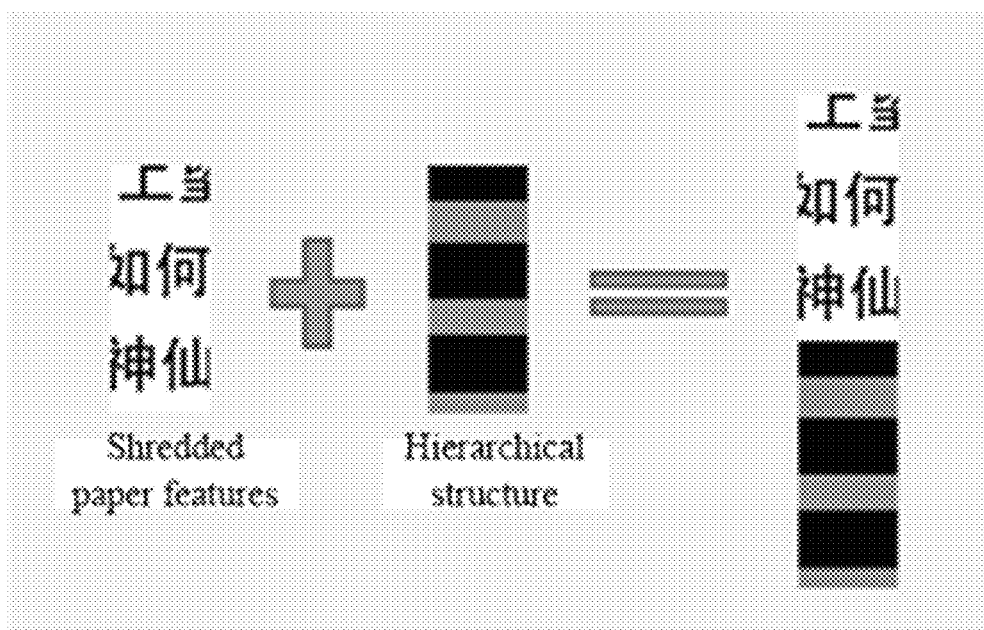
FIG. 7 is a schematic diagram of combined features of text type shredded paper according to an embodiment of the present invention.

FIG. 2 is a diagram of a designed extreme learning machine neural network model according to an embodiment of the present invention; FIG. 3 is a schematic diagram of shredded paper with an irregular edge according to an embodiment of the present invention; FIG. 4 is a schematic diagram of shredded paper with a regular edge according to an embodiment of the present invention; FIG. 5 is an edge feature display diagram according to an embodiment of the present invention; FIG. 6 is a visual diagram of shredded paper feature distribution according to an embodiment of the present invention; and FIG. 7 is a schematic diagram of combined features of text type shredded paper according to an embodiment of the present invention.

The above methods of the present invention are all implemented by splicing and restoring text type shredded paper. A method for splicing and restoring a color image is similar, except that the color image does no need to be binarized when left and right boundary feature extraction is performed, because the shredded paper of the color image is relatively fragmented, the similarity is extremely high, especially for an image with a Gaussian blur effect, which is not convenient for binarization. Therefore, it is only necessary to directly extract left and right boundary features of the shredded paper. Moreover, for a color image, a piece of shredded paper is randomly selected by the model as the first piece of shredded paper of a spliced line, which does not need to follow the principle that the left boundary is a white edge.

Figure 8:
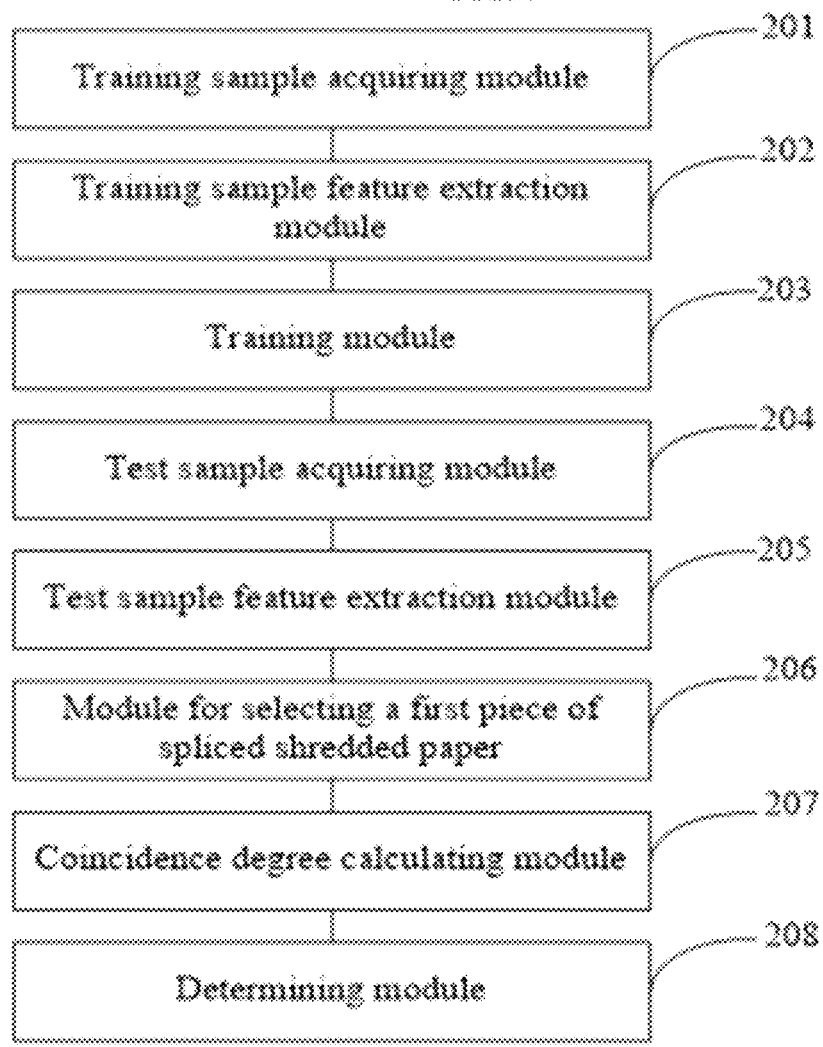
FIG. 8 is a structural diagram of a system for splicing and restoring shredded paper based on an extreme learning machine according to an embodiment of the present invention.

FIG. 8 is a structural diagram of a system for splicing and restoring shredded paper based on an extreme learning machine according to an embodiment of the present invention. As shown in FIG. 8, the system for splicing and restoring shredded paper based on an extreme learning machine is provided. The system includes:

a training sample acquiring module 201, configured to acquire a shredded paper training sample to be spliced;

a training sample feature extraction module 202, configured to extract left and right boundary feature data of the shredded paper training sample;

a training module 203, configured to train an extreme learning machine neural network model according to the left and right boundary feature data, to obtain a trained neural network model;

a test sample acquiring module 204, configured to acquire a shredded paper test sample to be spliced;

a test sample feature extraction module 205, configured to extract left and right boundary feature data of the shredded paper test sample;

a module 206 for selecting a first piece of spliced shredded paper, configured to select a piece of shredded paper as a first piece of to-be-spliced shredded paper according to a principle of splicing a first piece of paper;

a coincidence degree calculating module 207, configured to select shredded paper with a highest degree of coincidence with the first piece of to-be-spliced shredded paper by the trained neural network model; and a determining module 208, configured to determine whether the shredded paper with the highest degree of coincidence is correctly spliced to the first piece of to-be-spliced shredded paper;

if yes, splice shredded paper until all the shredded paper is spliced and restored; and if not, adopt manual marking, and continue to select shredded paper with a highest degree of coincidence with the first piece of to-be-spliced shredded paper by the trained neural network model.

The training sample feature extraction module specifically includes:

a binarization processing unit, configured to perform binarization processing on the shredded paper training sample to obtain a sequence pixel matrix; and a left and right boundary feature data extraction unit, configured to combine the pixel matrix information with text information of the shredded paper training sample to obtain the left and right boundary feature data of the shredded paper; where the left and right boundary feature data of the shredded paper is represented by a formula $\tilde{F}_{r\ or\ l} = \{a_1, a_2, a_3, a_4, \ldots, a_n\}$, where $a_i$ represents an edge pixel value and $a_i$ is equal to 0 or 255.

The principle of splicing a first piece of paper is to select a piece of shredded paper with a left boundary being a white edge as a first piece of shredded paper of a spliced line.

The training module specifically includes:

an output data acquiring unit, configured to use the left and right boundary feature data as an input of an extreme learning machine neural network model to obtain output data; and a determining unit, configured to determine whether the output data is within an error range threshold;

if yes, determine the neural network model as a trained neural network model; and if not, adjust parameter weights of the neural network model such that the output data is within the error range threshold to obtain a trained neural network model.

Specific Embodiment 1

In the present invention, eight groups of shredded paper with different cutting degrees are adopted for testing, where some data adopts public data and another part adopts simulation data, specifically as follows:

(1) Data of Chinese shredded paper in attachments I and II of a question B of CUMCM in 2013 is 25.4 mm*698.5 mm, 19 pieces in total, the attachment I is in Chinese, and the attachment II is in English;

(2) a simulation data color image set 442 mm*3.5 mm, 191 pieces in total;

(3) Data of Chinese shredded paper in attachments III and IV of the question B of CUMCM in 2013 is 25.4 mm*63.5 mm, 209 pieces in total, the attachment III is in Chinese, and attachment IV is in English;

(5) a simulation data color image set 5.29 mm*47.63 mm, 96 pieces in total;

(6) a simulation data color image set 2 mm*47.63 mm, 96 pieces in total;

(7) a simulation data color image set 1.85 mm*11.38 mm, 64 pieces in total;

Because the model is a process of simulating manual splicing of paper, it is necessary to select a piece of shredded paper as the beginning of the splicing. For text type shredded paper, the shredded paper with the left boundary being blank can be selected as the beginning of the splicing; for color image type shredded paper, it is impossible to simply determine a serial number of the shredded paper of a starting line, so a method for randomly selecting two ends for splicing is used for restoration;

left and right boundary feature data of each piece of shredded paper is extracted, a threshold value in step 1.4.1 is set to 255, and the obtained left and right boundaries of the shredded paper are marked as $\tilde{F}_{il}$ and $\tilde{F}_{ir}$ respectively (where i corresponds to the paper serial number, and l and r represent the left and right boundaries respectively);

according to the selected initial shredded paper, the selected shredded paper boundary feature data $\tilde{F} = X_i = [x_{i1}, x_{i2}, \ldots, x_{in}]^T$ is input into a total extreme learning machine model of 1.8; a neural network is trained according to a method and a label of 1.8.3, β is calculated to calculate neural network parameters $w_i$, $b_i$, and $\beta_i$ corresponding to the current shredded paper;

the remaining shredded paper other than the selected shredded paper is matched, left boundary features of each piece of shredded paper is input into the neural network model trained by the left boundary features of the selected shredded paper, and an output result and a corresponding training label are input into a coincidence degree covariance calculation formula of 1.9, a value calculated for each piece of shredded paper is recorded as $Z_i$, a minimum value is selected from a Zi sequence for splicing, the next training in step 3 is performed using selected shredded paper at this time, and step 4 is repeated to complete the splicing work of the line sequence.

There will be a small amount of errors in the splicing process. Feedback is made to the system by manual marking. The system negatively motivates an error sequence according to the feedback, that is, a covariance calculation value is set to a very large value, and a $Z_i$ sequence in step 4 is subjected to rearrangement selection to obtain correct series. Experimental results show that the need for manual marking is extremely low in the case where the degree of encryption of the shredded paper is not high, and the influence on the splicing efficiency is negligible.

After the horizontally and vertically cut shredded paper is subjected to line arrangement in step 4, upper and lower boundary features of the line shredded paper sequence can be converted into left and right boundary features to continue to use the model of the present invention for splicing, so that the restoration is completed, and see FIG. 8 for splicing results of display data. The results show that the accuracy of splicing of the relatively fragmented color image is generally high, while the similarity of single shredded paper of the color image is high, so that the manual splicing is very difficult. The model proposed in this patent can greatly improve the splicing efficiency.

The reduction rates of the eight groups of data participating in the test under no manual intervention are as shown in the following table:

TABLE 1

| Reduction rate table for each sample type | |
| --- | --- |
| Sample type | Reduction rate |
| 12 mm * 698.5 mm * 19 (Chinese) | 100% |
| 12 mm * 698.5 mm * 19 (English) | 100% |
| 442 mm*3.5 mm * 191 (color) | 100% |
| 25.4 mm * 63.5 mm * 209 (Chinese) | 87.8% |
| 25.4 mm * 63.5 mm * 209 (English) | 44.9% |
| 5.29 mm * 47.63 mm*96 (color) | 97.8% |
| 2 mm * 47.63 mm*96 (color) | 98.16% |
| 1.85 mm*11.38 mm * 64 (color) | 74.19% |

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:

1. A method for splicing and restoring shredded paper based on an extreme learning machine, wherein the method comprises:

acquiring a shredded paper training sample to be spliced;

extracting left and right boundary feature data of the shredded paper training sample;

training an extreme learning machine neural network model according to the left and right boundary feature data, to obtain a trained neural network model;

acquiring a shredded paper test sample to be spliced;

extracting left and right boundary feature data of the shredded paper test sample;

selecting a piece of shredded paper as a first piece of to-be-spliced shredded paper according to a principle of splicing a first piece of paper;

selecting shredded paper with a highest degree of coincidence with the first piece of to-be-spliced shredded paper by the trained neural network model;

determining whether the shredded paper with the highest degree of coincidence is correctly spliced to the first piece of to-be-spliced shredded paper;

if yes, splicing shredded paper until all the shredded paper is spliced and restored; and if not, adopting manual marking, and continuing to select shredded paper with a highest degree of coincidence with the first piece of to-be-spliced shredded paper by the trained neural network model, wherein the extracting left and right boundary feature data of the shredded paper training sample specifically comprises:

performing binarization processing on the shredded paper training sample to obtain a sequence pixel matrix; and combining information from the sequence pixel matrix with text information of the shredded paper training sample to obtain the left and right boundary feature data of the shredded paper, wherein the left and right boundary feature data of the shredded paper is represented by a formula $\tilde{F}_{r\ of\ 1} = \{a_1, a_2, a_3, a_4, \ldots, a_n\}$, wherein $a_i$ represents an edge pixel value and $a_i$ is equal to 0 or 255.

2. The method for splicing and restoring shredded paper based on an extreme learning machine according to claim 1, wherein the principle of splicing a first piece of paper is to select a piece of shredded paper with a left boundary being a white edge as a first piece of shredded paper of a spliced line.

3. The method for splicing and restoring shredded paper based on an extreme learning machine according to claim 1, wherein the training an extreme learning machine neural network model according to the left and right boundary feature data, to obtain a trained neural network model specifically comprises:

using the left and right boundary feature data as an input of an extreme learning machine neural network model to obtain output data;

determining whether the output data is within an error range threshold;

if yes, determining the neural network model as a trained neural network model; and if not, adjusting parameter weights of the neural network model such that the output data is within the error range threshold to obtain a trained neural network model.

4. A system for splicing and restoring shredded paper based on an extreme learning machine, wherein the system comprises a processor configured to:

acquire a shredded paper training sample to be spliced;

extract left and right boundary feature data of the shredded paper training sample;

train an extreme learning machine neural network model according to the left and right boundary feature data, to obtain a trained neural network model;

acquire a shredded paper test sample to be spliced;

extract left and right boundary feature data of the shredded paper test sample;

select a piece of shredded paper as a first piece of to-be-spliced shredded paper according to a principle of splicing a first piece of paper;

select shredded paper with a highest degree of coincidence with the first piece of to-be-spliced shredded paper by the trained neural network model; and determine whether the shredded paper with the highest degree of coincidence is correctly spliced to the first piece of to-be-spliced shredded paper;

if yes, splice shredded paper until all the shredded paper is spliced and restored; and if not, adopt manual marking, and continue to select shredded paper with a highest degree of coincidence with the first piece of to-be-spliced shredded paper by the trained neural network model;

wherein, the processor is further configured to:

perform binarization processing on the shredded paper training sample to obtain a sequence pixel matrix; and combine information from the sequence pixel matrix with text information of the shredded paper training sample to obtain the left and right boundary feature data of the shredded paper, wherein the left and right boundary feature data of the shredded paper is represented by a formula $\tilde{F}_{r\ of\ 1} = \{a_1, a_2, a_3, a_4, \ldots, a_n\}$, wherein $a_i$ represents an edge pixel value and $a_i$ is equal to 0 or 255.

5. The system for splicing and restoring shredded paper based on an extreme learning machine according to claim 4, wherein the principle of splicing a first piece of paper is to select a piece of shredded paper with a left boundary being a white edge as a first piece of shredded paper of a spliced line.

6. The system for splicing and restoring shredded paper based on an extreme learning machine according to claim 5, wherein the processor is further configured to:

use the left and right boundary feature data as an input of an extreme learning machine neural network model to obtain output data; and determine whether the output data is within an error range threshold;

if yes, determine the neural network model as a trained neural network model; and if not, adjust parameter weights of the neural network model such that the output data is within the error range threshold to obtain a trained neural network model.

* * * * *